United States Patent [19]

Friedman

[11] Patent Number: 6,097,812
[45] Date of Patent: Aug. 1, 2000

[54] CRYPTOGRAPHIC SYSTEM

[75] Inventor: William F. Friedman, Washington, D.C.

[73] Assignee: The United States of America as represented by the National Security Agency, Washington, D.C.

[21] Appl. No.: 02/682,096

[22] Filed: Jul. 25, 1933

[51] Int. Cl.[7] ............................. H04L 9/38; H04L 9/10; H04L 17/02; H04L 17/16

[52] U.S. Cl. ........................... 380/26; 380/287; 380/52; 380/56; 380/57; 380/59; 341/50; 341/90; 341/91

[58] Field of Search ................................. 380/255, 259, 380/270, 287, 26, 51, 52, 55, 56, 57, 58, 59, 27, 47; 341/50, 90, 91; 178/17 A

[56] References Cited

U.S. PATENT DOCUMENTS

| | | | |
|---|---|---|---|
| 1,356,546 | 10/1920 | Morehouse | 380/47 |
| 1,522,775 | 1/1925 | Friedman | 380/27 |
| 1,683,072 | 9/1928 | Hebern | 380/52 |
| 1,912,183 | 5/1933 | Dirkes et al. | 178/17 A |

*Primary Examiner*—Bernarr E. Gregory

[57] ABSTRACT

The crytographic system automatically and continuously changes the cipher equivalents representing plaintext characters so as to prevent any periodicity in the relationship. The system has a series of juxtaposed, rotatable, connection changing mechanisms to provide a large number of alternative paths for the passage of an electric current corresponding to a message character. Further, the system has parts for the irregular and permutative displacements of the members of a set of circuit changing mechanisms to thwart cryptanalysis.

28 Claims, 2 Drawing Sheets

CRYPTOGRAPHIC SYSTEM

This invention relates to cryptographic systems and has for its object the provision of means for automatically and continuously changing the cipher equivalents representing plain-text characters so as to prevent any periodicity in this relationship.

Another object of the invention is the improvement of existing cryptographs employing a series of juxtaposed, rotatable, connection-changing mechanisms which provide an enormous number of alternative paths for the passage of an electric current corresponding to a message character, from the transmitting contacts of the keyboard to the indicating elements of the recording mechanism.

A further object is to provide means for the irregular and permutative displacements of the members of a set of circuit changing mechanisms so as to eliminate any predictable factors in the movements of the circuit changing mechanisms with the result that unauthorized persons, even though they may possess identical cryptographs, will be unable to decipher messages so enciphered.

BRIEF DESCRIPTION OF THE DRAWINGS

The invention is explained in connection with the accompanying drawings, in which.

DETAILED DESCRIPTION OF THE INVENTION

Figure 1:
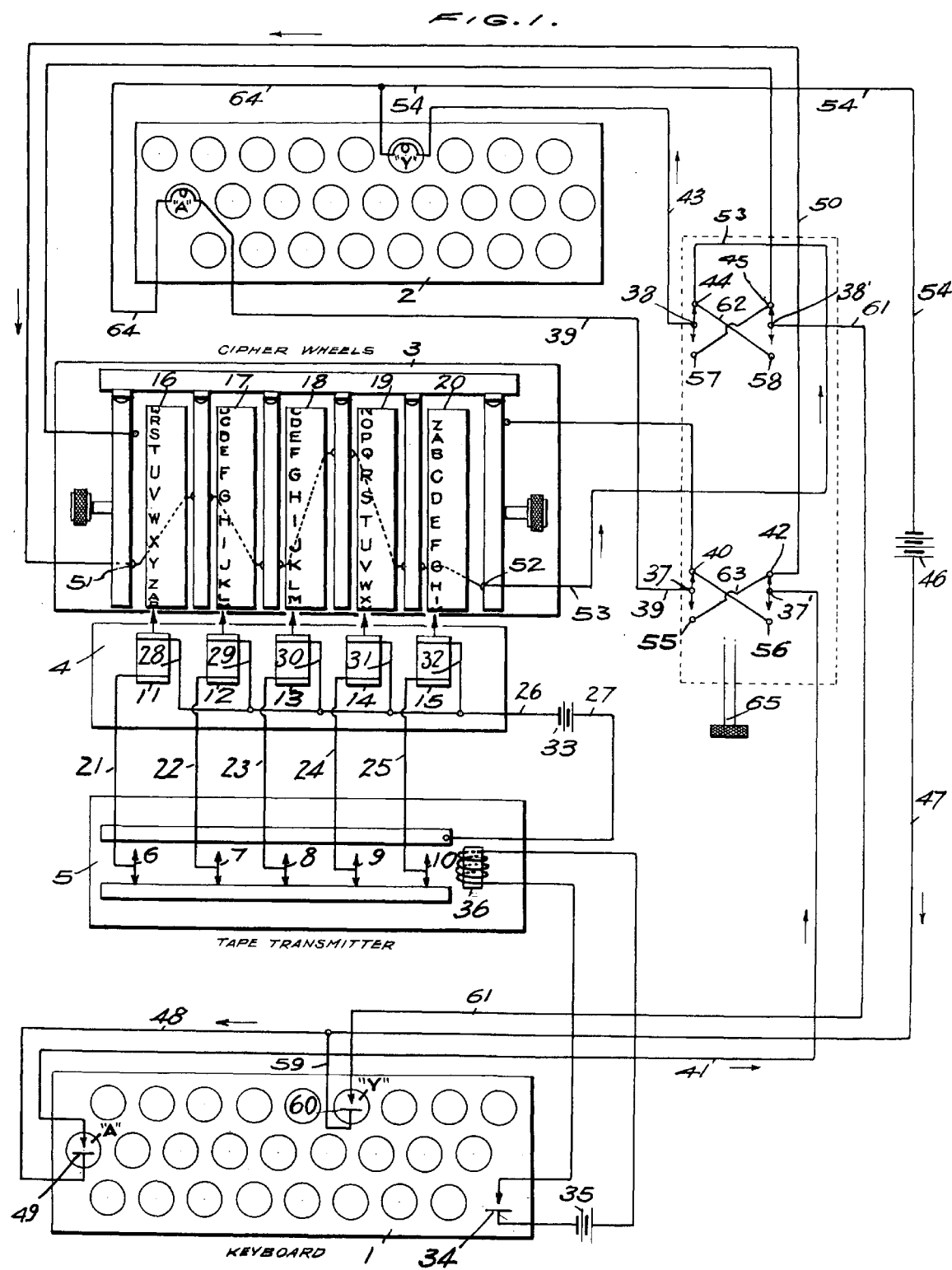
FIG. 1 is a diagrammatic view of a mechanism embodying the invention, employing one tape-transmitter.
Figure 2:
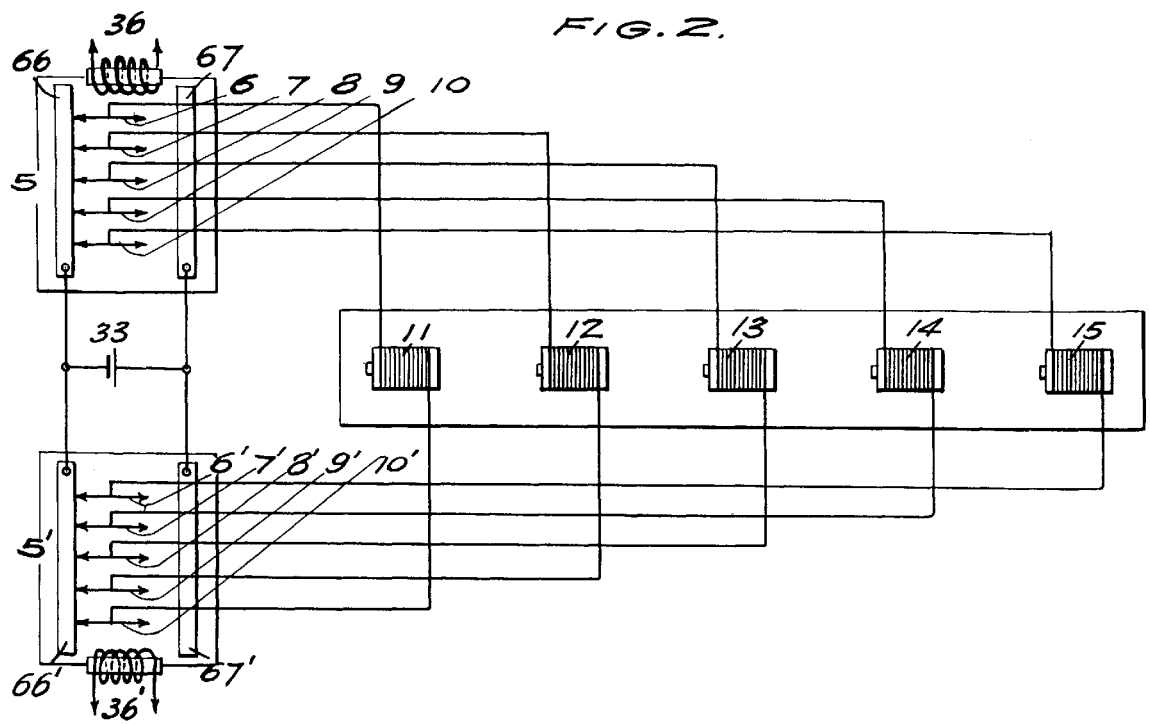
FIGS. 2 and 3 show diagrammatically the interacting relation of a plurality of tape-transmitters.

In FIG. 1, which is merely diagrammatic, there are shown the following elements all of which are well-known in the art applicable to modern cryptographs: The numeral 1 generally designates a standard typewriter keyboard provided with a set of keys for closing a set of contacts corresponding to the 26 letters of the alphabet; the numeral 2 generally designates a recording or indicating device which may comprise translating devices such as the magnets of a printing mechanism, or the translating devices may take the form of a bank of glow lamps to indicate by illumination of superimposed lettering the equivalents resulting from encipherment or decipherment; 3 generally designates a set of juxtaposed, rotatable circuit changers constructed in the form of cipher wheels or disks, mountable upon a common shaft and arranged to rotate relative to one another and to fixed end disks, in order to provide a large series of variable paths for the passage of electric currents representing message characters, the exact path in each instance being determined by the relative rotary positions of the whole set of cipher wheels and end disks at that instant. The essence of my invention consists in the addition of a set of cipher-wheel stepping mechanisms, generally designated by the numeral 4, which may be controlled by a sensing mechanism such as one or more tape-transmitters of the usual type employed in Baudot systems of printing telegraphy. In FIG. 1 only one such tape-transmitter is shown as at 5. In FIG. 2 two such transmitters are shown in interaction as at 5 and 5'; and in FIG. 3 three transmitters are shown in interaction as at 5, 5' and 5".

In cryptographs of this general character the principal reliance for cryptographic security is placed upon keeping secret the initial conditions as regards the relative positions and the arrangement of the cipher wheels at the beginning of the cryptographic operations. These initial conditions constitute the "key", and the latter usually consists of two paths. First, the specific horizontal permutation of the cipher wheels upon the shaft, that is, the order of the wheels from left to right or right to left between the stationary disks must be indicated. Each cipher wheel consists of two rings of 26 contacts, one ring on the obverse face, the other on the reverse face; the contacts of the obverse face are connected, by insulated conductors passing through the wheel, to those of the reverse face in an entirely random manner. The cipher wheels bear identifying designations and are interchangeable as regards the order in which they may be inserted into their positions upon the shaft, and it is usual to agree upon a key which indicates that order. For example, in a cryptograph constructed for five cipher wheels, the key 4-1-3-2-5 may mean that cipher wheel number 4 is placed in the first position next to the left stationary disk, cipher wheel number 1, in the second position, and so on. The cipher wheels may be inserted on the shaft in a right side up or up side down position. Since the wirings within the respective wheels are different, it is obvious that each of the 10×8×6×4×2 or 3840 different permutations of the five wheels is available. Each such permutation will produce different cipher results from every other permutation because the complete path through the whole set of wheels is established by the juxtaposition of five separate paths, one in each wheel. The sequence or arrangement of the individual cipher wheels upon the shaft will hereafter be called the permutative key. The second part of the key is the specific alignment of identifying marks on the peripheries of the cipher wheels after they have been inserted on the shaft according to the permutative key. The periphery of each wheel bears a series of 26 identifying characters corresponding to the 26 stopping positions of the wheel as it is displaced by rotation on the shaft. The initial rotatory positions of the five cipher wheels relative to one another and to the stationary end disks, as designated by the horizontal sequence of the identifying characters on their peripheries as aligned on a "bench mark" on the end disks, will hereinafter be called the rotatory key. In cryptographs of the type under consideration the permutative key remains fixed, as a rule, throughout the encipherment of a message or a series of messages; the initial rotatory key usually changes from message to message.

Now in all cryptographs based upon the use of rotatable cipher wheels of the type referred to above, and arranged as indicated, means are embodied within the cryptograph for automatically changing the rotatory positions of the cipher wheels during the course of enciphering or deciphering a message; these means are always of such a nature as to make these changes of a definite and predetermined character. For example, in Hebern, U.S. Pat. No. 1,683,072, the fixed character of the successive rotatory movements of the cipher wheels is explained in quite a detailed manner, and the same is true as regards similar cryptographs produced abroad. The progression of the cipher wheels in these cases is similar to that of indicating meters or counting mechanisms, which are basically regular or periodic in their motion. This regularity or periodicity of motion produces predictable relationships between the plain-text characters and the cipher characters for any given initial rotatory key. Thus, should the cryptograph and cipher messages fall into the hands of unauthorized parties, the latter can place themselves in a position to decipher the messages largely as a result of the predetermined nature of the successive rotatory displacements of the cipher wheels, even though the initial keys may not be known.

Figure 3:
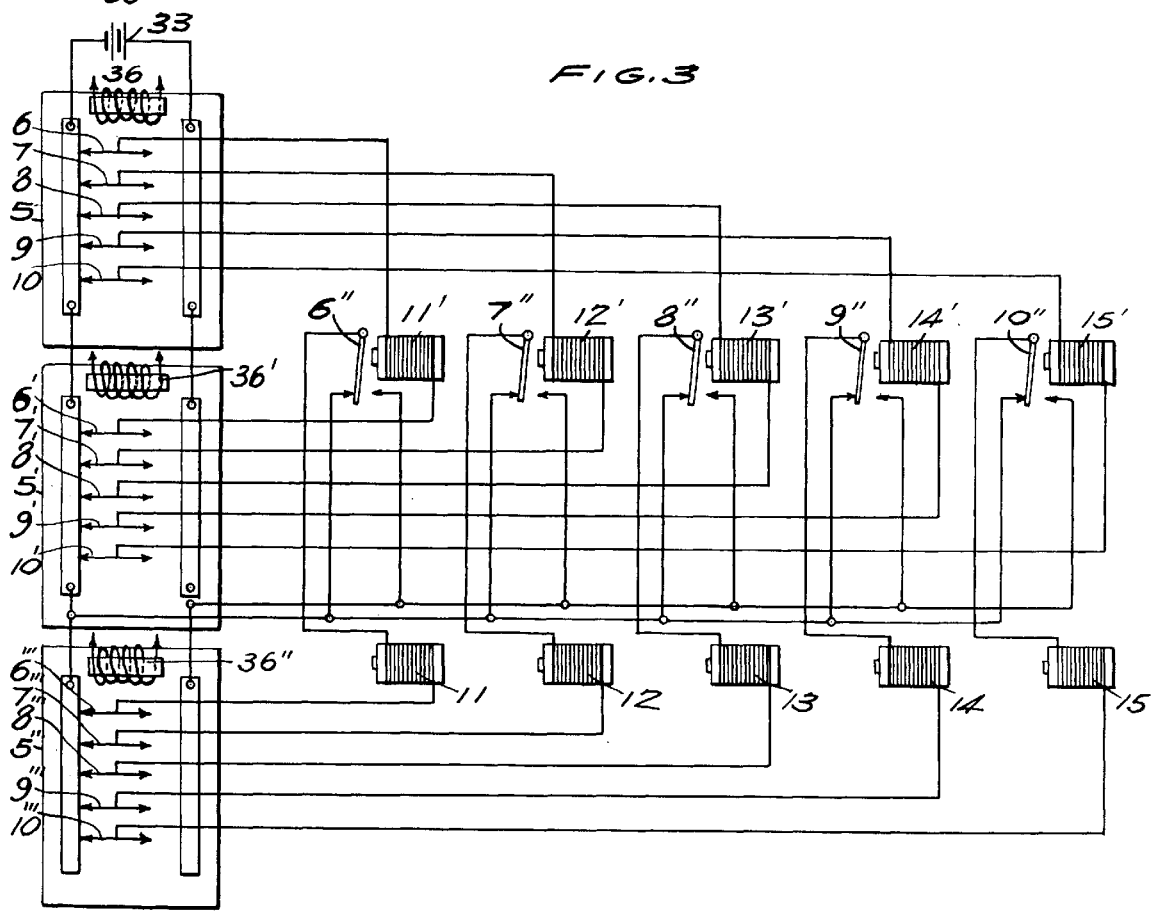

The basic feature of my invention is the elimination of this predictable factor and the provision of a mechanism for displacing the cipher wheels in an entirely irregular, aperiodic manner. This is accomplished by means of the wheel-stepping mechanisms shown as at 4, and operated in the present embodiment by individual magnets which are controlled by the single tape transmitter 5 of FIG. 1, or by two or more tape transmitters as shown in FIGS. 2 and 3. In this description I show a cryptograph with a set of five rotatable cipher wheels and a transmitter using a plural unit code based upon the permutations of two elements through five positions, but it is obvious that the invention is applicable to a cryptograph using a fewer or a greater number of cipher wheels and a plural-unit code of a different type than the well-known Baudot five-unit code.

Tape transmitter 5 in FIG. 1 is of the type well known in printing telegraphy, but only one of the usual two bus bars is connected to current source in this case. The transmitter is operated by a tape bearing a series of perforations permuted in accordance with the Baudot code. The perforations in the tape control the action of the five contact members 6–10, which, in turn, through the circuit including power source 33, and conductors 21 to 32, inclusive control the action of the five magnets, 11, 12, 13, 14, 15, as a set of elements operable in a permutative manner, as will be shown subsequently.

The magnets 11 to 15, with their associated stepping mechanisms, which may be of the ratchet and pawl type, control, permutatively, the displacement, in step-wise manner, of the individual cipher wheels 16 to 20, and thus continuously vary, in an irregular, aperiodic manner, the rotatory positions of the five cipher wheels in encipherment or decipherment. It is assumed naturally that correspondents must be equipped with a similar cryptographs and similar cipher wheels, wired identically, and that the correspondents are provided with identical key tapes for controlling the movements of the cipher wheels. The exact initial permutative and rotatory key and the initial point of action of the key tape must also be the same between correspondents, and can be predetermined by agreement.

The working arrangement may be such that on the back stroke of any key of the keyboard, a contact 34, controlled by a universal bar on the keyboard is closed, and the circuit from power source 35, for operating the tape step-forward magnet 36, is closed. The next character on the tape is brought into play, the cipher-wheel magnets, 11 to 15, are operated and the cipher wheels are set to a new position for the encipherment (or decipherment) of the next character of the message.

The enciphering-deciphering circuits will now be set forth in detail. Let us assume that the cryptograph is to encipher a message. A switch control mechanism 65, carrying a series of 52 movable contact members similar to the four shown at 37, 37', 38 and 38', all mounted on the same base, is set to "enciphering". This brings contact member 37 against contact 40, contact member 38' against contact 42, contact member 38 against contact 44, and contact member 36' against contact 45. Suppose key "A" on the keyboard is depressed. A current from power source 46 flows along conductors 47, 48, through closed contact 49, conductor 41, contact member 37', contact 42, to 51, which is one of the contacts on the contacts on the left-end fixed disk; the current then continues along a zigzag path through the cipher wheels, emerging at 52, which is one of the contacts on the right-end fixed disk, thence along conductor 53, contact 44, contact member 38, conductor 43, through lamp or indicator "Y", conductor 54, back to the other pole of power source 46. Lamp or indicator "Y" is energized and the cipher equivalent of "A" is "Y", for the particular setting of the cipher wheels shown in the figure. For a different setting of the cipher wheels, depression of "A" would yield some other letter. If the cipher wheels are displaced each time key "A" is depressed, the successive cipher equivalents will be casually different, and will vary in a completely aperiodic manner so long as the displacements of the cipher wheels are aperiodic, as would be the case in my invention with a key tape consisting of a random sequence of Baudot perforations. The arrangement at the keyboard is such that on the release of any key a universal bar closes the circuit for operating the tape stepping mechanism as explained above, thus causing the particular Baudot character then at the key-tape transmitter to actuate the five magnets 11 to 15, and thus set up a new rotatory arrangement of the cipher wheels 16 to 20.

Let us now reverse the operation and decipher. In this case the control device 65 for bringing the cryptograph to the deciphering condition is set so as to bring contact member 37 against contact 55, contact member 37' against contact 56, contact member 38 against contact 57, and contact member 38' against contact 58. The cipher wheels 16–20 are assumed to be at exactly the same rotatory position they were in when "A" was enciphered and produced cipher "Y". Now depress key "Y" on the keyboard. A current from power source 46 flows along conductors 47, 59, closed contact 60 at "Y", conductor 61, contact member 38', contact 58, conductor 62, contact 44, conductor 53, contact 52, thence through the cipher wheels, emerging at contact 51, thence along conductor 50, contact 42, conductor 63, contact 55, contact member 37, conductor 39, thence through through lamp or indicator "A", conductors 64, 54 back to the other pole of power source 46. Thus lamp or indicator "A" is actuated and cipher "Y" reproduces plain text "A".

The reciprocal relationship between all the plain text and cipher letters is accomplished in the same way; only four of the 52 contact members shown at 37, 37', 38 and 38' are indicated in the drawing, but they are all mounted upon one base and are moved into their enciphering or deciphering position by the single control 65 which moves them as a set to the right or to the left for enciphering or deciphering, respectively. All 26 upper right-hand contacts on this movable plate, similar to those at 40 and 44, are wired to the 26 contacts on the right-end fixed disk; all 26 lower right-hand contacts of the movable plate, similar to those at 42 and 45, are wired to the 26 contacts on the left-end fixed disk. This arrangement for effecting reciprocity in enciphering and deciphering is, however, not a part of my invention. This method and others for accomplishing the same purpose are known in cryptographs of this type.

The effect of various keying arrangements with the cryptograph of my invention will now be shown and will be taken up individually.

First, let us assume that the permutative key of cipher wheels and the key tape remain the same for a series of messages. The key tape may be started at the same initial point for all messages or at different initial points for different messages. Assuming the former case, diversity of cipher resultants for identical plain-text messages may be brought about by different initial rotatory positions of the five cipher wheels. For example, a message beginning "Proceed at once", enciphered with the initial rotatory key "White", will yield a different cipher text from that enciphered with the initial rotatory key "Write". Thus, since there are available, with a set of five cipher wheels, $26^5$ different initial rotatory keys, the potentialities of the cryptograph in this respect are apparent.

Now assume that the key tape is in the form of a continuous ring and can be started at different initial points.

A message enciphered with the same initial rotary key can be enciphered in as many different forms as there are characters on the key tape; if it is 10,000 units in length, 10,000 versions of the same message can be produced by staring each message at a different initial point on the tape.

It goes without saying that by using many different tapes, and changing the permutative key of the cipher wheels on the shaft, the cryptograph will afford an almost limitless diversity of cryptographic results.

All the foregoing variations are entirely aperiodic in character, so that no cyclic phenomena such as are used in the analysis of the usual types of automatic cryptographs are available for solving messages produced by the cryptograph of my invention.

FIG. 2 shows two tape-transmitters, 5 and 5', jointly controlling the magnets 11 to 15, which are identical with similarly designated magnets of FIG. 1. In this arrangement two different cipher-key tapes in the form of continuous rings govern the operation of the tape transmitters. The tape passing through transmitter 5 brings the set of contact members 6, 7, 8, 9, and 10 against bus bar 66 or bus bar 67 in a permutative manner; similarly, the tape passing through transmitter 5' brings the set of contact members 6', 7', 8', 9', and 10' against bus bar 66' or bus bar 67' in a permutative manner. The circuits are such that only when homologous contact members are in contact with opposite bus bars will current flow from power source 33 through the magnet controlled by this pair of homologous contact members. The tape stepping magnets 36 and 36' are controlled by a contact operated by the universal bar of the keyboard.

The object of such an arrangement with two interacting tape transmitters is to provide a very long resultant, or secondary cipher key by the interaction of two relatively short, primary keys. For example, suppose a circular tape containing 1000 characters is passed through tape transmitter 5, and another circular tape containing 999 characters is passed through tape transmitter 5'. If the two tapes are started at given initial points and are moved forward synchronously by single steps, then these same initial points will not again present themselves simultaneously to the contact pins until a total of 999,000 steps have been made. Thus, two key tapes of 1000 and 999 characters produce a resultant key of 999,000 characters.

Going one step further, three or more tape transmitters may be caused to interact to produce still longer resultant keys. For example, three tapes 1001, 1000, and 999 characters in length will produce by interaction a resultant key of 999,999,000 characters. FIG. 3 shows how three cipher-key tape transmitters would be interconnected to bring this about. Transmitters 5 and 5' interact to control relays 11', 12', 13', 14' and 15'. The armatures 6", 7", 8", 9", and 10", of the latter relays act in the same manner as do the contact members 6 to 10 and 6' to 10' of the tape transmitters 5 and 5', respectively. The interaction of the armatures 6" to 10" with the contact members 6''' to 10''' of the third transmitter 5", controls the operation of magnets 11 to 15, which serve the function indicated by identically numbered magnets of FIGS. 1 and 2. The tape-stepping magnets 36, 36' and 36" are all in the same circuit controlled by the universal bar of the keyboard, so that all three tapes are moved synchronously.

By an extension of this manner of interconnecting tape transmitters and relays, it is possible to have a set of four, five, or more tape transmitters all interacting to control collectively the magnets of the cipher-wheel stepping mechanisms.

It is one of the notable features of my invention that while employing all the permutations of the Baudot code, 32 in number, as keying characters, the final cryptogram is composed of only the usual 26 letters of the ordinary alphabet. The six extra permutations (those other than the ones representing the 26 letters of the alphabet), which, in systems using the Baudot code as a basis for a cipher key, cause much difficulty, either in their elimination by automatic means, or if the latter is not possible, in their representation in written characters having standard equivalents in the Morse code, have been automatically eliminated from the cryptograms, since all the Baudot permutations have been excluded from direct interaction with the message characters in my system.

I claim:

1. In a cryptograph, a keyboard comprising character elements in operative electrical connection with corresponding signaling elements; means comprising a set of juxtaposed, rotatable commutators for varying the connections between the keyboard elements and said signaling elements; a cipher-key transmitter; and means coordinated with the transmitter to effect permutative, stepwise displacements of the commutators.

2. In a cryptograph, a keyboard comprising character elements in operative electrical connection with corresponding signaling elements; means comprising a set of juxtaposed, rotatable commutators for varying the connections between the keyboard elements and said signaling elements; a cipher-key transmitter mechanism; and means coordinating said mechanism with the commutators to effect permutative, stepwise displacements of the commutators.

3. In a cryptograph, a keyboard comprising character elements in operative electrical connection with corresponding signaling elements; means comprising a set of juxtaposed, rotatable commutators for varying the connections between the keyboard elements and said signaling elements; a cipher-key transmitter mechanism; and a series of commutator stepping mechanisms, the cipher-key transmitter mechanism being operatively associated with the commutator stepping mechanisms to effect permutative, stepwise displacements of the commutators.

4. In a cryptograph, a keyboard comprising character elements in operative electrical connection with corresponding signaling elements; means comprising a set of juxtaposed, rotatable commutators for varying the connections between the keyboard elements and said signaling elements; a plurality of cipher-key transmitters; and means coordinating said transmitters to effect permutative, stepwise displacements of the commutators.

5. In a cryptograph, a keyboard comprising character elements in operative electrical connection with corresponding signaling elements; means comprising a set of juxtaposed, rotatable commutators for varying the connections between the keyboard elements and said signaling elements; a plurality of cipher-key transmitters; a series of commutator stepping mechanisms each comprising an electro-magnet and an associated ratchet and pawl, each ratchet and pawl actuating the associated commutator, the set of commutator stepping mechanisms being controlled by the said cipher-key transmitters associated as a group and coordinated collectively to effect permutative, stepwise displacements of the commutators.

6. In a cryptograph, a keyboard comprising character elements in operative electrical connection with corresponding signaling elements; means comprising a set of juxtaposed, rotatable commutators for varying the connections between the keyboard elements and said signaling elements; a cipher-key transmitter mechanism; and means coordinating said mechanism with the commutators to effect permutative, stepwise displacements of the commutators, the cipher-key transmitter mechanisms being controlled by a keying element which is independent of the cryptograph, said element comprising a perforated tape bearing ciphering characters in a plural unit code.

7. In a cryptograph, a keyboard comprising character elements in operative electrical connection with corresponding signaling elements; means comprising a set of juxtaposed, rotatable commutators for varying the connections between the keyboard elements and said signaling elements; a plurality of cipher-key transmitters; and means coordinating the transmitters to effect permutative, stepwise displacements of the commutators, the transmitters being controlled by separate keying elements which are external to and independent of the cryptograph.

8. In a cryptograph, a keyboard comprising character elements in operative electrical connection with corresponding signaling elements; means comprising a set of juxtaposed, rotatable commutators for varying the connections between the keyboard elements and said signaling elements; a cipher-key transmitter mechanism; and means coordinating said mechanism with the commutators to effect permutative, stepwise displacements of the commutators, the cipher-key transmitter mechanism being controlled by a keying element which is external to and independent of the cryptograph, and which includes a perforated tape bearing perforations permuted in accordance with a plural-unit code to represent characters in that code.

9. In a cryptograph, a keyboard comprising character elements in operative electrical connection with corresponding signaling elements; means comprising a set of juxtaposed, rotatable commutators for varying the connections between the keyboard elements and said signaling elements; a plurality of cipher-key transmitters; and means coordinating the transmitters to effect permutative, stepwise displacements of the commutators, the said transmitters being controlled by separate keying elements which are external to and independent of the cryptograph, and which include perforated tapes bearing perforations permuted in accordance with a plural-unit code to represent characters in that code.

10. In a cryptograph, a keyboard comprising character elements in operative electrical connection with corresponding signaling elements; means comprising a set of juxtaposed, rotatable commutators for varying the connections between the keyboard elements and said signaling elements; a plurality of cipher-key transmitters; and means coordinating the transmitters to effect permutative, stepwise displacements of the commutators, the said transmitters being controlled by individual keying elements which are external to and independent of the cryptograph, and which include perforated tapes bearing perforations permuted in accordance with a plurality unit code to represent characters in that code, the numbers of such characters in the respective tapes being prime to one another.

11. In a cryptograph of the character described, the combination of a set of juxtaposed, rotatable commutators; a set of commutator stepping mechanisms; and a plural-unit-code cipher-key transmitter for controlling the commutator stepping mechanisms to effect permutative, stepwise displacements of the commutators.

12. In a cryptograph of the character described, the combination of a set of juxtaposed, rotatable commutators; a set of commutator stepping mechanisms; and a plurality of plural-unit-code cipher-key transmitters electrically associated for collectively controlling the commutator stepping mechanisms to effect permutative, stepwise displacements of the commutators.

13. In a cryptograph of the character described, the combination of keyboard elements and signaling elements; a set of juxtaposed, rotatable commutators for varying the connections between the two sets of elements; a series of commutator stepping mechanisms for displacing the respective commutators in a stepwise manner; and a plural-unit-code cipher-key transmitter for controlling the commutator stepping mechanisms to effect the stepwise displacements of the commutators in a permutative manner.

14. In a cryptograph of the character described, the combination of keyboard elements and signaling elements; a set of juxtaposed, rotatable commutators for varying the connections between the two sets of elements; a set of commutator stepping mechanisms for displacing the respective commutators in a step-wise manner; and a plurality of plural-unit-code cipher-key transmitters for collectively controlling the commutator stepping mechanisms to effect the stepwise displacements of the commutators in a permutative manner.

15. A mechanism of the character described, comprising a set of elements constituting a keyboard, and a set of elements constituting a signaling bank, said sets of elements being electrically interrelated; a set of juxtaposed, rotatable switching devices for the varying the electrical relation between the two sets of elements; and means for effecting stepwise displacements of the switching devices in an aperiodic manner.

16. A mechanism of the character described, comprising a set of elements constituting a keyboard, a set of elements constituting a signaling bank, and including electrical connections between said sets of elements; a set of juxtaposed, rotatable switching devices for the varying the connections between the two sets of elements; and means for effecting stepwise displacements of the switching devices in an aperiodic manner, said means being controlled by an element which is external to and independent of the mechanism itself.

17. A mechanism of the character described, comprising a set of elements constituting a keyboard, a set of elements constituting a signaling bank, and including electrical connections between said sets of elements; a set of juxtaposed, rotatable switching devices for varying the connections between the two sets of elements; and means for effecting stepwise displacements of the switching devices in an aperiodic manner, the stepwise displacements of the set of switching devices being permutative in character.

18. A mechanism of the character described, comprising a set of elements constituting a keyboard, a set of elements constituting a signaling bank, and including circuit connections between said sets of elements; a set of juxtaposed, rotatable switching devices for varying the connections between the two sets of elements; means for effecting stepwise displacements of the switching devices in an aperiodic manner, the stepwise displacements of the set of switching devices being permutative in character, the permutations of said displacements being determined by an external key.

19. A mechanism of the character described, comprising a set of elements constituting a keyboard, a set of elements constituting a signaling bank, and including circuit connections between said sets of elements; a set of juxtaposed, rotatable switching devices for varying the connections between the two sets of elements; means for effecting stepwise displacements of the switching devices in an aperiodic manner, the displacements of the set of switching devices being permutative in character; and means comprising an external key for determining the permutations of said displacements, said key comprising a practically non-repeating series of ciphering characters arranged in random, unintelligible order, said characters being represented by perforations permuted in accordance with a plural unit code.

20. A mechanism of the character described, comprising a set of elements constituting a keyboard and a set of elements constituting a signaling bank; electrical connections between said sets of elements; a set of juxtaposed, rotatable switching devices for varying the connections between the two sets of elements; means for effecting stepwise displacements of the switching devices in an aperiodic manner, the displacements of the set of switching devices being permutative in character; and means comprising an external key for determining the permutations of said displacements, said key comprising a substantially non-repeating series of ciphering characters arranged in random, unintelligible order, and the said ciphering characters being employed successively to encipher successive characters of the message.

21. A mechanism of the character described, comprising a set of elements constituting a keyboard and a set of elements constituting a signaling bank; circuit connections between said sets of elements; a set of juxtaposed, rotatable switching devices for varying the connections between the two sets of elements; means for effecting stepwise displacements of the switching devices in an aperiodic manner, the displacements of the set of switching devices being permutative in character; and means comprising a plurality of independent but interacting external keys for determining the permutations of said displacements.

22. A mechanism of the character described, comprising a set of elements constituting a keyboard and a set of elements constituting a signaling bank; circuit connections between said sets of elements; a set of juxtaposed, rotatable switching devices for varying the connections between the two sets of elements; means for effecting stepwise displacements of the switching devices in an aperiodic manner, the displacements of the set of switching devices being permutative in character; and means comprising a plurality of independent but interacting external keys for determining the permutations of said displacements, each of said keys comprising a non-repeating sequence of ciphering characters arranged in random, unintelligible order.

23. A mechanism of the character described, comprising a set of elements constituting a keyboard and a set of elements constituting a signaling bank; circuit connections between said sets of elements; a set of juxtaposed, rotatable switching devices for varying the connections between the two sets of elements; means for effecting stepwise displacements of the switching devices in an aperiodic manner, the displacements of the set of switching devices being permutative in character; and means comprising a plurality of independent but interacting external keys for determining the permutations of said displacements, each of said keys comprising a non-repeating sequence of ciphering characters arranged in random, unintelligible order, and the interaction of the said keys producing a resultant single key consisting of an unintelligible sequence of characters which serves as the cipher key to encipher the successive characters of the message.

24. In combination a set of character elements constituting a keyboard; a switch individual to each element and operable thereby; a corresponding number of translating devices operable by said elements; a wiring system interposed between said switches and said translating devices rendering available a multiplicity of electrical paths between said switches and said devices; and means operable in response to each key operation for selecting a group of said paths, said last named means comprising a variably operable sensing mechanism.

25. In combination a set of character elements constituting a keyboard; a switch individual to each element and operable thereby; a corresponding number of translating devices operable by said elements; a wiring system interposed between said switches and said translating devices rendering available a multiplicity of electrical paths between said switches and said devices whereby each switch may become associated with any one of a plurality of said translating devices, said system comprising adjustably movable connectors whereby the wiring system may be given an initial setting providing one electrical path for each switch; and means operable in response to each key operation for changing such setting.

26. The combination set forth in claim 25, in which the last named means comprises a sensing mechanism operable by a perforated element.

27. The combination set forth in claim 25, in which the last named means comprises a plurality of relays corresponding in number to the number of movable connectors; and a sensing mechanism operable by an element perforated in accordance with a plural unit character code.

28. In combination a set of character elements constituting a keyboard; a switch individual to each element and operable thereby; a corresponding number of translating devices operable by said elements; a wiring system interposed between said switches and said translating devices rendering available a multiplicity of electrical paths between said switches and said devices whereby each switch may become associated with any one of a plurality of said translating devices, said system comprising a plurality of stationary annular commutator elements and rotatable annular commutator members interposed between each pair of fixed commutator elements, said members having a set of contacts on each face thereof, cooperating with the contacts of the adjacent stationary element, said members also having random cross connections between the contacts on the opposing faces thereof, whereby the wiring system may be given an initial setting at will; and means operable in response to each key operation for changing such setting.

* * * * *